(12) United States Patent
Peters et al.

(10) Patent No.: US 12,168,268 B2
(45) Date of Patent: Dec. 17, 2024

(54) REDUCTION OF DROPLET SIZE FOR $CO_2$ SHIELDED WELDING WIRE

(71) Applicant: Lincoln Global, Inc., Santa Fe Springs, CA (US)

(72) Inventors: Steven R. Peters, Huntsburg, OH (US); Matthew A. Weeks, Walloon (AU); Gregory M. McCall, Eastlake, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 659 days.

(21) Appl. No.: 17/505,768

(22) Filed: Oct. 20, 2021

(65) Prior Publication Data

US 2022/0371117 A1 Nov. 24, 2022

Related U.S. Application Data

(60) Provisional application No. 63/190,858, filed on May 20, 2021.

(51) Int. Cl.
*B23K 9/09* (2006.01)
*B23K 9/095* (2006.01)
(Continued)

(52) U.S. Cl.
CPC .............. *B23K 9/093* (2013.01); *B23K 9/095* (2013.01); *B23K 9/1068* (2013.01); *B23K 9/1735* (2013.01); *B23K 9/28* (2013.01)

(58) Field of Classification Search
CPC ...... B23K 9/093; B23K 9/095; B23K 9/1068; B23K 9/1735; B23K 9/28
See application file for complete search history.

(56) References Cited

U.S. PATENT DOCUMENTS

| | | |
|---|---|---|
| 1,368,287 A | 2/1921 | Pennington et al. |
| 1,605,860 A | 11/1926 | Snelling |

(Continued)

FOREIGN PATENT DOCUMENTS

| | | |
|---|---|---|
| CN | 2683302 Y | 3/2005 |
| CN | 101745726 A | 6/2010 |

(Continued)

OTHER PUBLICATIONS

Wolf Robotics; "Tandem Wire MIG Welding"; Dated Aug. 29, 2007; pp. 1-8.

(Continued)

*Primary Examiner* — Brian W Jennison
(74) *Attorney, Agent, or Firm* — David J. Muzilla

(57) ABSTRACT

An arc welding system providing improved molten metal droplet transfer. The system includes a welding power source having a welding power supply, a welding waveform generator, and a controller. Two fluxed cored welding wire electrodes are connected to the power source and are powered by the same welding output voltage and current produced by the power source. A feedback circuit is connected to the power source to provide an adaptive response to maintain an average welding output voltage. The controller controls the waveform generator and the power supply to superimpose welding current pulses onto a welding waveform of a CV flux cored arc welding process, that uses $CO_2$ as a shielding gas, to generate a modified waveform of a modified CV flux cored arc welding process. The current pulses are superimposed in time to form molten metal droplets between ends of the two electrodes during the modified welding process.

20 Claims, 10 Drawing Sheets

(51) Int. Cl.
  *B23K 9/10* (2006.01)
  *B23K 9/173* (2006.01)
  *B23K 9/28* (2006.01)

(56) References Cited

U.S. PATENT DOCUMENTS

| | | |
|---|---|---|
| 2,583,507 A | 1/1952 | Carpenter et al. |
| 2,594,333 A | 4/1952 | Medicus |
| 2,756,311 A | 7/1956 | Persson et al. |
| 2,849,593 A | 8/1958 | Volff et al. |
| 2,866,079 A | 12/1958 | Morley |
| 2,911,517 A | 11/1959 | Armstrong |
| 2,957,101 A | 10/1960 | Barkley |
| 3,131,325 A | 4/1964 | Briggs |
| 3,274,371 A | 9/1966 | Saenger, Jr. |
| 3,328,556 A | 6/1967 | Nelson |
| 3,384,778 A | 5/1968 | Jeannette |
| 3,624,345 A | 11/1971 | Armstrong |
| 3,693,858 A | 9/1972 | Araya |
| 3,694,620 A | 9/1972 | Gleason |
| 3,746,833 A | 7/1973 | Ujiie |
| 3,933,533 A | 1/1976 | Uchida |
| 4,012,621 A | 3/1977 | Uchida |
| 4,088,866 A | 5/1978 | Lund et al. |
| 4,182,947 A | 1/1980 | Brower |
| 4,295,746 A | 10/1981 | Hartmann |
| 4,336,441 A | 6/1982 | Godai |
| 4,437,906 A | 3/1984 | Tateishi |
| 4,475,996 A | 10/1984 | Inoue |
| 4,541,616 A | 9/1985 | Dean |
| 4,697,791 A | 10/1987 | Henderson et al. |
| 4,743,731 A | 5/1988 | Seuring |
| 4,902,873 A | 2/1990 | Ivannikov |
| 4,968,867 A | 11/1990 | Banzai |
| 5,148,001 A | 9/1992 | Stava |
| 5,324,552 A | 6/1994 | Opower |
| 5,440,100 A | 8/1995 | Stuart et al. |
| 5,491,321 A | 2/1996 | Stuart |
| 5,635,091 A | 6/1997 | Hori et al. |
| 5,714,735 A | 2/1998 | Offer |
| 5,782,987 A | 7/1998 | Furman |
| 5,791,560 A | 8/1998 | Rogers et al. |
| 5,816,466 A | 10/1998 | Seufer |
| 5,958,261 A | 9/1999 | Offer |
| 5,977,504 A | 11/1999 | Offer |
| 5,981,906 A | 11/1999 | Parker |
| 6,225,589 B1 | 5/2001 | Bartok |
| 6,172,333 B1 | 9/2001 | Stava |
| 6,374,655 B1 | 4/2002 | Hresc |
| 6,512,200 B2 | 1/2003 | Norrish et al. |
| 6,512,220 B1 | 1/2003 | Park |
| 6,627,839 B1 | 9/2003 | Luckowski |
| 6,683,271 B2 | 1/2004 | Rogers |
| 6,683,279 B1 | 1/2004 | Moerke |
| 6,737,616 B1 | 5/2004 | Sherrill |
| 7,112,759 B1 | 9/2006 | Severance, Jr. |
| 7,183,516 B2 | 2/2007 | Blankenship |
| 7,429,716 B2 | 9/2008 | Bong et al. |
| 7,495,192 B2 | 2/2009 | Takahashi |
| 7,525,067 B2 | 4/2009 | Diez |
| 7,705,269 B2 | 4/2010 | Daniel |
| 7,761,336 B1 | 7/2010 | Blankenship et al. |
| 7,777,447 B2 | 8/2010 | Vogel |
| 8,049,139 B2 | 11/2011 | Houston |
| 8,723,082 B2 | 5/2014 | Spiesberger |
| 9,186,745 B2 * | 11/2015 | Jia .................. B23K 9/1735 |
| 9,839,970 B2 * | 12/2017 | Peters ............... B23K 9/1735 |
| 9,862,056 B2 | 1/2018 | Berger et al. |
| 9,895,760 B2 | 2/2018 | Peters |
| 9,937,577 B2 | 4/2018 | Daniel et al. |
| 10,052,707 B2 | 8/2018 | Henry et al. |
| 10,792,752 B2 | 10/2020 | Weeks et al. |
| 2001/0008235 A1 | 7/2001 | Miszczak et al. |
| 2003/0209530 A1 | 11/2003 | Stuart et al. |
| 2004/0016735 A1 | 1/2004 | Huismann et al. |
| 2005/0218132 A1 | 10/2005 | Wells |
| 2005/0224486 A1 | 10/2005 | Matiash |
| 2005/0230373 A1 | 10/2005 | Kensrue |
| 2006/0070985 A1 | 4/2006 | Nakabayashi et al. |
| 2006/0081675 A1 | 4/2006 | Enyedy |
| 2006/0138115 A1 | 6/2006 | Norrish et al. |
| 2006/0226137 A1 | 10/2006 | Huismann et al. |
| 2006/0243704 A1 | 11/2006 | Matz et al. |
| 2007/0145028 A1 | 6/2007 | Artelsmair |
| 2007/0151964 A1 | 7/2007 | Artelsmair et al. |
| 2007/0158324 A1 | 7/2007 | O'Donnell et al. |
| 2007/0164074 A1 | 7/2007 | Schorghuber et al. |
| 2008/0128395 A1 | 6/2008 | Aigner et al. |
| 2008/0169336 A1 | 7/2008 | Spiegel et al. |
| 2008/0190900 A1 | 8/2008 | Zhang et al. |
| 2009/0050609 A1 | 2/2009 | Berger et al. |
| 2009/0234483 A1 | 9/2009 | Leko et al. |
| 2010/0213179 A1 | 8/2010 | Peters |
| 2010/0301030 A1 | 12/2010 | Zhang et al. |
| 2010/0314373 A1 | 12/2010 | Patterson |
| 2011/0171393 A1 | 7/2011 | Margolies et al. |
| 2011/0309062 A1 | 12/2011 | O'Donnell et al. |
| 2012/0067859 A1 | 3/2012 | Albrecht et al. |
| 2012/0074115 A1 | 3/2012 | Kazmaier et al. |
| 2012/0152921 A1 | 6/2012 | Peters et al. |
| 2012/0285938 A1 * | 11/2012 | McFadden ........ B23K 9/1336 219/130.1 |
| 2013/0193115 A1 | 8/2013 | Berg |
| 2013/0264323 A1 | 10/2013 | Daniel |
| 2014/0027413 A1 | 1/2014 | Lin et al. |
| 2014/0166633 A1 | 6/2014 | Albrecht |
| 2014/0197148 A1 | 7/2014 | Chen et al. |
| 2015/0209889 A1 | 7/2015 | Peters et al. |
| 2016/0228972 A1 | 8/2016 | Jogdand et al. |
| 2016/0368075 A1 | 12/2016 | Ide |
| 2017/0080511 A1 | 3/2017 | Jaeger et al. |
| 2017/0165779 A1 | 6/2017 | Barhorst et al. |
| 2017/0189982 A1 | 7/2017 | Hsu |
| 2017/0368629 A1 | 12/2017 | Grigorenko |
| 2018/0207744 A1 | 7/2018 | Stoecker |
| 2018/0214966 A1 | 8/2018 | Peters |
| 2018/0214967 A1 | 8/2018 | Peters |
| 2018/0214972 A1 | 8/2018 | Jansma et al. |
| 2018/0214973 A1 | 8/2018 | Jansma et al. |
| 2018/0281097 A1 | 10/2018 | Jansma |
| 2018/0369947 A1 | 12/2018 | Raudsepp et al. |
| 2019/0047069 A1 | 2/2019 | Weeks et al. |
| 2019/0168334 A1 | 6/2019 | Kooken et al. |
| 2019/0201997 A1 | 7/2019 | Stergios et al. |

FOREIGN PATENT DOCUMENTS

| | | |
|---|---|---|
| CN | 101870032 A | 10/2010 |
| CN | 102615398 A | 8/2012 |
| CN | 102430846 B | 5/2013 |
| CN | 103071899 A | 5/2013 |
| CN | 103170713 A | 6/2013 |
| CN | 103648702 A | 3/2014 |
| CN | 101712095 B | 9/2014 |
| CN | 104334305 A | 2/2015 |
| CN | 104439623 A | 3/2015 |
| CN | 205464747 U | 8/2016 |
| CN | 105983742 A | 10/2016 |
| CN | 106270978 A | 1/2017 |
| CN | 104972205 B | 4/2017 |
| CN | 106670630 A | 5/2017 |
| CN | 106735769 A | 5/2017 |
| CN | 206241445 U | 6/2017 |
| CN | 206578445 U | 10/2017 |
| CN | 109382566 A | 2/2019 |
| DE | 1115 382 B | 10/1961 |
| DE | 2 108 614 A1 | 10/1971 |
| DE | 42 04 661 C1 | 6/1993 |
| DE | 196 11 583 A1 | 9/1997 |
| DE | 196 11 597 A1 | 9/1997 |
| DE | 298 19 828 U1 | 11/1999 |
| DE | 197 38 785 C2 | 12/2001 |
| DE | 10 2008 014915 A1 | 11/2009 |
| DE | 20 2013 102 979 U1 | 7/2013 |

(56) References Cited

FOREIGN PATENT DOCUMENTS

| DE | 10 2016 003468 A1 | 9/2016 |
|---|---|---|
| DE | 10 2015 122135 A1 | 6/2017 |
| EP | 1707296 A1 | 10/2006 |
| EP | 1 294 522 B1 | 9/2007 |
| EP | 3446821 A1 | 2/2019 |
| EP | 3 656 497 A2 | 5/2020 |
| EP | 3 693 116 A1 | 8/2020 |
| GB | 990208 A | 4/1965 |
| GB | 1 502 288 A | 3/1978 |
| GB | 2 058 637 A | 4/1981 |
| JP | 02-258168 A | 10/1990 |
| JP | 02-280968 A | 11/1990 |
| JP | 4053617 B | 8/1992 |
| JP | H10-113771 A | 5/1998 |
| JP | 2008-055506 A | 3/2008 |
| JP | 2008-087045 A | 4/2008 |
| JP | 2010-069494 A | 4/2010 |
| JP | 2010-082624 A | 4/2010 |
| JP | 5133079 B2 | 1/2013 |
| JP | 2013-039624 A | 2/2013 |
| JP | 5157006 B2 | 3/2013 |
| JP | 5580869 B2 | 8/2014 |
| JP | 6137053 B2 | 5/2017 |
| KR | 2001-0002945 A | 1/2001 |
| KR | 10-2010-0115997 A | 10/2010 |
| KR | 10-1412374 B1 | 6/2014 |
| SU | 1237347 A1 | 6/1986 |
| WO | 1997045227 A1 | 12/1997 |
| WO | 2010/080411 A1 | 7/2010 |
| WO | 2012/153177 A1 | 11/2012 |

OTHER PUBLICATIONS

Leng, et al.; "The characteristic of twin-electrode TIG coupling arc pressure"; Journal of Physics D: Applied Physics; vol. 39(6): 1120; Dated Mar. 3, 2006.
D/F Machine Specialties; "D/F Automatic & Robotic MIG Tandem Torch"; https://www.dfmachinespecialties.com/index.php?option=com_content&view=article&id=35; Accessed on Oct. 15, 2018; pp. 1-4.
Ye, et al.; "Research on arc interference and welding operating point change of twin wire MIG welding"; The International Journal of Advanced Manufacturing Technology; vol. 89, Issue 1-4; Dated Mar. 2017; pp. 493-502.
Ueyama, et al.; "Effects of torch configuration and welding current on weld bead formation in high speed tandem pulsed gas metal arc welding of steel sheets"; Science and Technology of Welding and Joining; vol. 10, No. 6; Dated 2005; Published Online Dec. 4, 2013; pp. 750-759.
Fronius; "CMT Twin"; https://www.fronius.com/en/welding-technology/products/robotic-welding/migmag-high-performance/cmt-twin/cmt-twin; Accessed on Oct. 15, 2018; pp. 1-5.
SKS Welding Systems; "Dual Wire 2.0 for double-speed welding"; https://www.sks-welding.com/en/torch-systems/dual-wire/dual-wire-20/product.html; Accessed on Oct. 15, 2018; pp. 1-2.
Lincoln Electric; "Tandem MIG™ 800 Amp Welding Torch"; https://www.lincolnelectric.com/assets/US/EN/literature/E10601.pdf; Accessed on Oct. 15, 2018; pp. 1-4.
Wire Wizard; "Weld Cell Monitoring and Optimization System"; https://www.wire-wizard.com/ELCoCatalog_web.pdf; Accessed on Oct. 17, 2018; p. 42.
Lincoln Electric; "Wire Level Gauge"; https://www.lincolnelectric.com/assets/us/en/literature/mc0995.pdf; Accessed on Oct. 17, 2018; p. 6.
Miller; Auto-Continuum 350 and 500 w/ Insight Core User Manual; https://www.millerwelds.com/files/owners- manuals/O273473D_MIL.pdf; Dated Nov. 2016; Section 8, pp. 40-43.
Extended European Search Report from Corresponding Application No. 18187717.6; Dated Jan. 4, 2019; pp. 1-10.
Extended European Search Report from Corresponding Application No. 19203369.4; Dated Jul. 31, 2020; pp. 1-8.
Extended European Search Report from Corresponding Application No. EP19203389.2; Dated Jun. 22, 2020; pp. 1-9.
Shi, et al.; "Physical Characteristics of Twin-Wire Indirect Arc Plasma;" Vacuum; vol. 107; Dated Apr. 3, 2014; pp. 41-50.
Extended European Search Report from Corresponding Application No. 19205296.7; Dated Aug. 13, 2020; pp. 1-13.
Extended European Search Report from Corresponding Application No. 19205356.9; Dated Aug. 13, 2020; pp. 1-9.
Extended European Search Report from Corresponding Application No. 21156359.8; Dated Jul. 9, 2021; pp. 1-8.
Extended European Search Report from Corresponding Application No. 21153533.1; Dated Jul. 20, 2021; pp. 1-9.

* cited by examiner

REDUCTION OF DROPLET SIZE FOR $CO_2$ SHIELDED WELDING WIRE

CROSS REFERENCE TO RELATED APPLICATION/INCORPORATION BY REFERENCE

This U.S. patent application claims priority to and the benefit of U.S. provisional patent application Ser. No. 63/190,858 filed on May 20, 2021, which is incorporated herein by reference in its entirety. U.S. Pat. No. 10,792,752, issued on Oct. 6, 2020, is incorporated herein by reference in its entirety.

FIELD

Embodiments of the present invention relate to gas shielded arc welding. More particularly, some embodiments of the present invention relate to systems and methods for providing a reduction in molten metal welding wire droplet size formed in $CO_2$ gas shielded arc welding processes (e.g., a flux cored arc welding (FCAW) process using $CO_2$ gas for shielding).

BACKGROUND

FCAW can be a semi-automatic or automatic arc welding process that uses a continuously-fed consumable electrode containing a flux and, typically, a constant-voltage welding power supply. An externally supplied shielding gas is often used along with the flux to generate the necessary protection from the atmosphere. FCAW is often used in construction because of its high welding speed and portability. Most of the development of FCAW wires for use with $CO_2$ involves conventional constant voltage (CV) power sources and constant speed wire feeders focusing on improvements to welding wire or, more specifically, the contents of the core of the welding wire. $CO_2$ wires are often used to improve penetration, and are used in parts of the world where argon and argon blended gases are excessively expensive. Conventional FCAW welding wires, shielded under $CO_2$ gas, transfer metal droplets to a weld pool in a drop or globular form. The repulsive force of $CO_2$ pushes back on the molten droplets as they are created, allowing larger droplets to form. When used, for example, in a parallel or dual wire configuration, the droplets can grow even larger. The large droplets are often chaotic, hindering the operability and often resulting in spatter expelled during the welding process.

SUMMARY

A system and process provides arc regulation (e.g., during a $CO_2$ FCAW process) involving a characteristic of voltage and amperage along with a superimposed pulse of current. The superimposed pulse of current serves to agitate a molten droplet back and forth during a growth stage of the droplet at the end of one or more welding wires. The agitation promotes the droplet to touch the weld pool more consistently and sooner, ensuring that the droplet does not become undesirably large.

In one embodiment, an arc welding system providing improved molten metal droplet transfer is provided. The system includes a welding power source having a welding power supply, a welding waveform generator, and a controller. Two flux cored welding wire electrodes are operatively connected to the welding power source. The two flux cored welding wire electrodes are powered by a same welding output voltage and welding output current produced by the welding power source. A feedback circuit is operatively connected to the welding power source to provide an adaptive response to maintain an average welding output voltage. The controller is programmed to control at least the welding waveform generator and the welding power supply to superimpose welding current pulses onto a welding waveform of a constant voltage (CV) flux cored arc welding process to generate a modified waveform of a modified CV flux cored arc welding process. The modified CV flux cored arc welding process uses $CO_2$ as a shielding gas. The superimposed welding current pulses are superimposed in time to facilitate formation of molten metal droplets between ends of the two fluxed cored welding wire electrodes during the modified CV flux cored arc welding process. This results in the molten metal droplets being smaller in size, at times of transfer to a weld puddle, than otherwise would be without the superimposed welding current pulses. In one embodiment, a single droplet of the molten metal droplets is transferred to the weld puddle for every two or more pulses of the superimposed welding current pulses. The feedback circuit may include a voltage feedback circuit and/or a current feedback circuit, in accordance with various embodiments. The $CO_2$ shielding gas constricts the welding output current as the welding output current leaves an end of a droplet of the molten metal droplets, creating an upward force on the droplet away from the weld puddle. Each current pulse of the superimposed welding current pulses generates an upward force on a droplet of the molten metal droplets away from the weld puddle. In one embodiment, the arc welding system includes a user interface configured to adjust at least one of an amplitude, a duration, and a frequency of the superimposed welding current pulses. In one embodiment, the arc welding system includes a welding gun configured to facilitate passage of the two flux cored welding wire electrodes there-through, and at least one wire feeder configured to feed the two flux cored welding wire electrodes to the welding gun. In one embodiment, the welding gun includes a contact tip through which the two flux cored welding wire electrodes are configured to pass side-by-side and out of a same orifice of the contact tip.

In one embodiment, an arc welding method providing improved molten metal droplet transfer is provided. The method includes superimposing welding current pulses onto a welding waveform of a constant voltage (CV) flux cored arc welding process in a welding power source to generate a modified waveform of a modified CV flux cored arc welding process. The method also includes powering two flux cored welding wire electrodes by a same welding output voltage and welding output current produced by the welding power source during the modified flux cored arc welding process using the modified waveform. The method further includes providing $CO_2$ as a shielding gas as part of the modified flux cored arc welding process. The superimposed welding current pulses are superimposed in time to facilitate formation of molten metal droplets between ends of the two flux cored welding wire electrodes during the modified CV flux cored arc welding process, resulting in the molten metal droplets being smaller in size, at times of transfer to a weld puddle, than otherwise would be without the superimposed welding current pulses. In one embodiment, a single droplet of the molten metal droplets is transferred to the weld puddle for every two or more pulses of the superimposed welding current pulses. The $CO_2$ shielding gas constricts the welding output current as the welding output current leaves an end of a droplet of the molten metal droplets, creating an upward force on the droplet away from the weld puddle. Each current pulse of the superimposed welding current pulses generates an upward force on a droplet of the molten metal droplets away from the weld puddle. In one embodiment, the method includes adjusting at least one of an amplitude, a duration, and a frequency of the superimposed welding current pulses via a user interface of the welding power source. One embodiment includes feeding the two flux cored welding wire electrodes to a welding gun via a wire feeder, and passing the two flux cored welding wire electrodes side-by-side through and out of a same orifice of a contact tip of the welding gun. In one embodiment, the method includes regulating a voltage-current (VI) characteristic of the welding power source during the modified flux cored arc welding process, and adapting the voltage-current (VI) characteristic to maintain an average welding output voltage and an average arc length during the modified flux cored arc welding process as the two flux cored welding wire electrodes are powered by the welding power source. The method also includes feeding back at least one of the welding output voltage or the welding output current to a controller of the welding power source to facilitate the adapting of the voltage-current (VI) characteristic.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The examples and figures herein are illustrative only and are not meant to limit the subject invention, which is measured by the scope and spirit of the claims.

Many power sources control FCAW processes by regulation of a voltage-current (VI) characteristic that is based on power, voltage with a current component, or current with a voltage component. On top of this regulation, an adaptive response is often added to maintain an average arc length even when the operator or machine varies (changes) the length of the contact tip to work distance (CTWD). FCAW shielded under $CO_2$ gas is a very dynamic process where the droplet emerges, grows, and moves around very quickly in space. The VI characteristic counter-reacts to this movement by the application of magnetic forces induced by current varied in response to changing voltage. The set point of the VI characteristic is adjusted in a long term adaptive control to maintain relatively constant arc length. Changes in the contact tip to work distance (CTWD) occur relatively slowly with respect to changes, and to movement to the droplet on the end of the consumable welding wire.

Many conventional transformer designs were designed based on a voltage that was reduced as current increased at a rate between ½ to 8 volts per 100 amps. Many modern inverters designs are programmed to mimic this response with an added adaptive control to maintain a true average constant voltage. In one embodiment of the present invention, a VI characteristic of voltage with a drop of 5 volts per 100 amps is employed, using a set-point of 35 volts, operating at 200 amps, resulting in 10 volts of drop, making the regulation voltage 25 volts. A long term adaptive control adjusts the set point to maintain an average preset of 25 volts.

In accordance with an embodiment of the present invention, when a delta current (a current pulse) is superimposed at a set frequency via programming, the size of droplets forming on the end of the welding wire electrode can be reduced. Each current pulse induces a magnetic repulsive force on the droplet pushing it further away from the weld pool. When the current pulse is completed, and the output returns to the steady state VI characteristic, the magnetic force is relaxed and the droplet bounces (via surface tension) back toward the weld pool and often touches the weld pool initiating metal transfer before the droplet gets too large (larger than desired). This agitation promotes faster/smaller droplets to transfer to the weld pool making the process more controlled. Furthermore, the adaptive response, acting to regulate an average voltage, will reduce the VI set-point (responding to the current pulses) thus allowing the push from feeding wire to overcome the repulsive force acting on the droplet.

Figure 1:
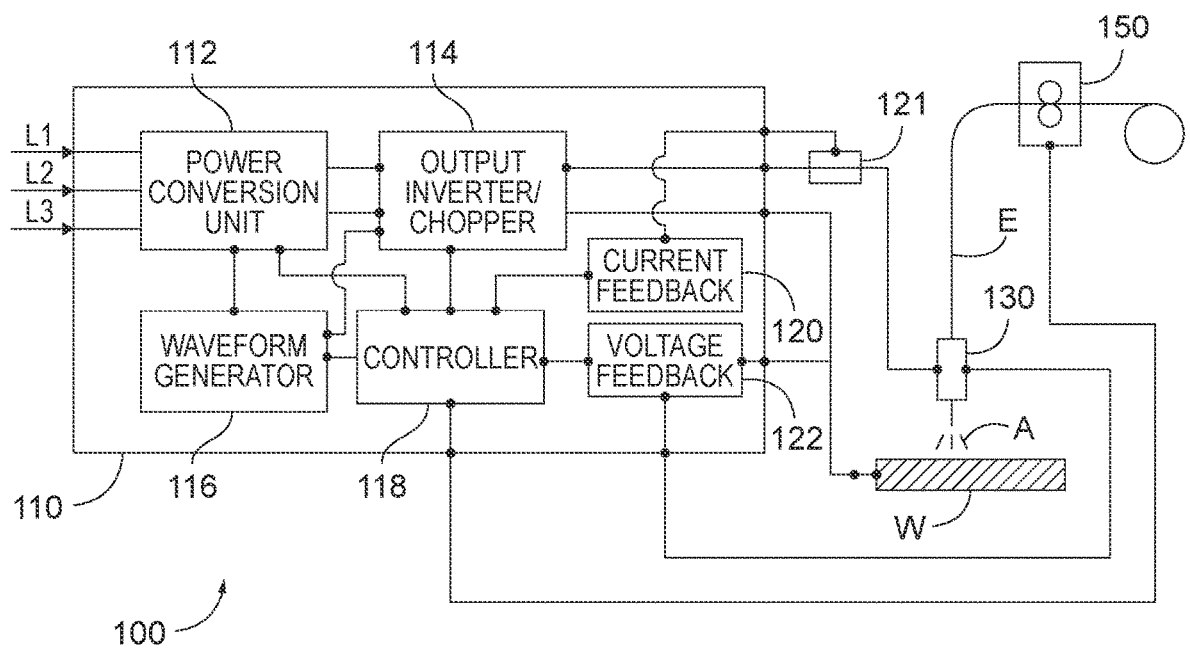
FIG. 1 illustrates one embodiment of an arc welding system that includes a welding power source.

Referring now to the drawings, wherein the showings are for the purpose of illustrating exemplary embodiments of the subject invention only and not for the purpose of limiting same, FIG. 1 illustrates one embodiment of an arc welding system 100 that includes a welding power source 110. The welding power source 110 delivers a welding waveform output to a welding gun/torch 130 and a workpiece W through at least one welding wire electrode E (e.g., two welding wire electrodes E) to generate a welding arc A. The welding wire electrode(s) E is delivered to the welding operation via at least one wire feeder 150. The wire feeder 150 can be of any known construction such that it is capable of delivering the electrode(s) E to the weld and, in some embodiments, the wire feeder 150 can adjust the wire feed speed of the electrode(s) E based on a signal from the power source 110.

In one embodiment, two flux cored welding wire electrodes E are operatively connected to the welding power source 110. The two flux cored welding wire electrodes E are powered by the same welding output voltage and welding output current produced by the welding power source 110. The welding gun is configured to facilitate passage of the two flux cored welding wire electrodes there-through. The wire feeder is configured to feed the two flux cored welding wire electrodes to the welding gun. The welding gun includes a contact tip through which the two flux cored welding wire electrodes are configured to pass side-by-side (e.g., see U.S. Pat. No. 10,792,752, issued on Oct. 6, 2020, which is incorporated herein by reference in its entirety).

The general construction of the power source 110 can be similar to that of known power sources that are capable of, for example, GMAW and FCAW type welding operations, so long as the power source 110 is capable of functioning and operating as described herein. For example, the power source 110 can be constructed similar to that of the Power Wave® type power sources, manufactured by The Lincoln Electric Company, of Cleveland, Ohio. Of course, embodiments of the present invention are not limited to such a construction, and this is intended to be merely exemplary.

As shown in FIG. 1, the power source 110 is configured to receive an input signal through L1, L2 and L3. FIG. 1 depicts a 3-phase input, but other embodiments can utilize a single phase input. The power source 110 includes a power conversion unit 112 which is capable of receiving the input signal and outputting a signal to an output phase (such as an output inverter 114) so that the output of the power source 110 is capable of sustaining a welding arc. The power conversion unit 112 can be made up of a number of different components. For example, it can be comprised of a rectifier circuit and a buck-boost circuit which receives the rectified signal and outputs a constant voltage to the output inverter 114. Of course in other exemplary embodiments, the output inverter 114 can be a chopper, or any other type of output circuit that is capable of working with the power conversion unit 112 to output a welding signal. In accordance with one embodiment, the power conversion unit 112 and the output inverter/chopper 114 together are referred to herein as a welding power supply, or just a power supply.

The power source 110 also includes a waveform generator 116 which is a circuit which aids in controlling the output of at least one, or both, of the power conversion unit 112 and the output inverter 114 to provide the desired welding waveform to be used to generate the arc A. For example, the waveform generator 116 can be used to generate a desired current waveform used to create and maintain the arc A during welding, coupled with one or both of the power conversion unit 112 and the output inverter 114 (or whatever output component is utilized). In addition, the power source 110 has a controller 118 which can be, for example, any type of CPU or processor-type device capable of controlling functions and operations of the power source 110. For example, see the controller 1000 of FIG. 10 herein. Other types of controllers are possible as well having, for example, various types of electronic circuitry (e.g., logic circuitry) and memory.

In one embodiment, the controller 118 receives feedback from a current feedback circuit 120 and a voltage feedback circuit 122 which provide current and voltage feedback (respectively) from the welding arc A during a welding operation. With this feedback, the controller 118 is able to adjust and optimize the performance of the power source 110 to provide the desired output. For example, in one embodiment, a feedback circuit 122 is operatively connected to (e.g., is a part of) the welding power source 110 and provides an adaptive response to maintain an average welding output voltage. In one embodiment, the current feedback circuit 120 is part of a current sensing configuration, which includes a current shunt 121, and is electrically connected to the gun 130. As shown in FIG. 1, in some embodiments, the controller 118 is also coupled to a wire feeder 150 which allows the controller to receive feedback from the wire feeder 150 as well as control the operation of the wire feeder 150, such as wire feed speed, during a welding operation.

In one embodiment, the controller 118 is programmed to control at least the welding waveform generator 116 and the welding power supply to superimpose welding current pulses onto a welding waveform of a constant voltage (CV) flux cored arc welding process to generate a modified waveform of a modified CV flux cored arc welding process. The superimposed welding current pulses are superimposed in time to facilitate formation of molten metal droplets between ends of two fluxed cored welding wire E electrodes during the modified CV flux cored arc welding process. This results in the molten metal droplets being smaller in size, at times of transfer to a weld puddle, than otherwise would be without the superimposed welding current pulses.

Figure 2:
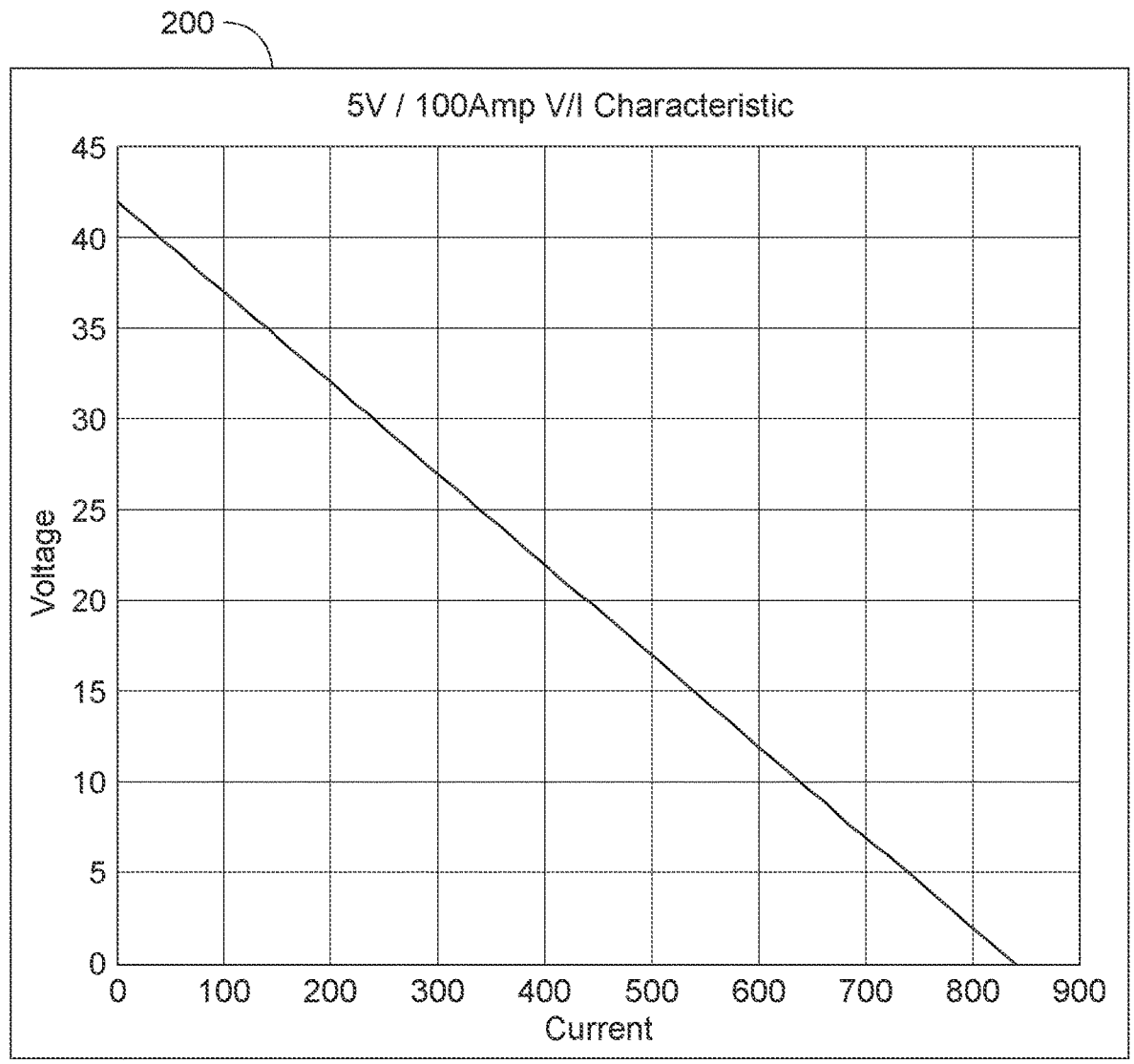
FIG. 2 illustrates one embodiment of a graph of a conventional voltage-amp characteristic representing how a welding power source is regulated.

FIG. 2 illustrates one embodiment of a graph 200 of a conventional voltage-amp (VI) characteristic representing how a welding power source may be regulated. The voltage-amp characteristic of the graph 200 has a 5 volt slope for every 100 amps of current. For example, if a preset voltage is set to 24 volts then, using the graph 200, the welding power source would deliver 360 amps of current during an arc welding process. As a droplet of molten metal is created on the tip of a welding wire electrode(s) during the arc welding process, the droplet moves around in space. If the droplet gets closer to the weld puddle (weld pool), the voltage may drop to 23 volts, for example. The current would then increase to 380 amps. Such an increase in current will tend to drive the droplet away from the puddle, and the arc length will become longer and the voltage will become larger. At 25 volts, the current would be 340 amps. The lower current allows the droplet to come closer to the weld puddle. The regulated system drives the arc welding process to a natural equilibrium. In one embodiment, an adaptive control (e.g., controlled by the controller 118) drives the average voltage of the system to a preset voltage by adjusting a set point of the graph 200 (described as open circuit voltage (OCV)=42 volts in this example) up or down to make the equilibrium point equal to the desired voltage.

Figure 3:
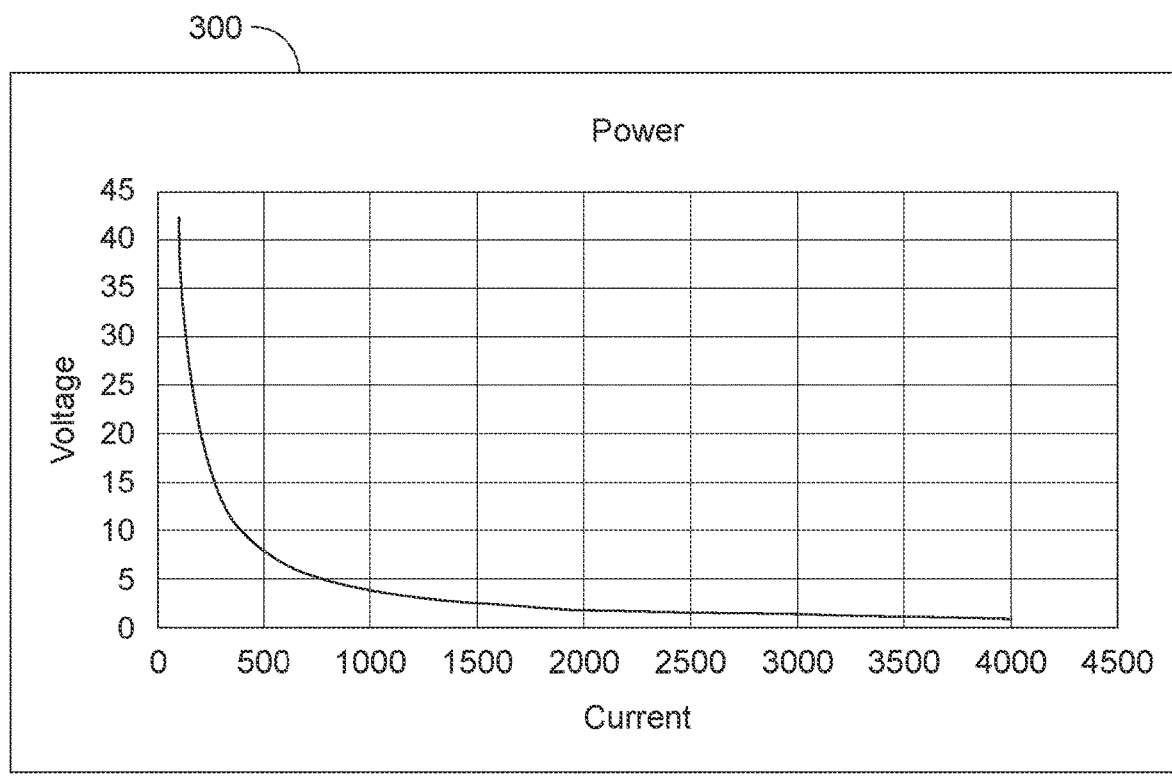
FIG. 3 illustrates one embodiment of a graph of a conventional power output curve.

FIG. 3 illustrates one embodiment of a graph 300 of a conventional power output curve. A power output curve is another method to regulate a welding power source. Similar to the slope in FIG. 2, the power output curve drives the output to an equilibrium point. A power set point may or may not have an adaptive control to drive the system to a preset voltage, in accordance with various embodiments.

Figure 4:
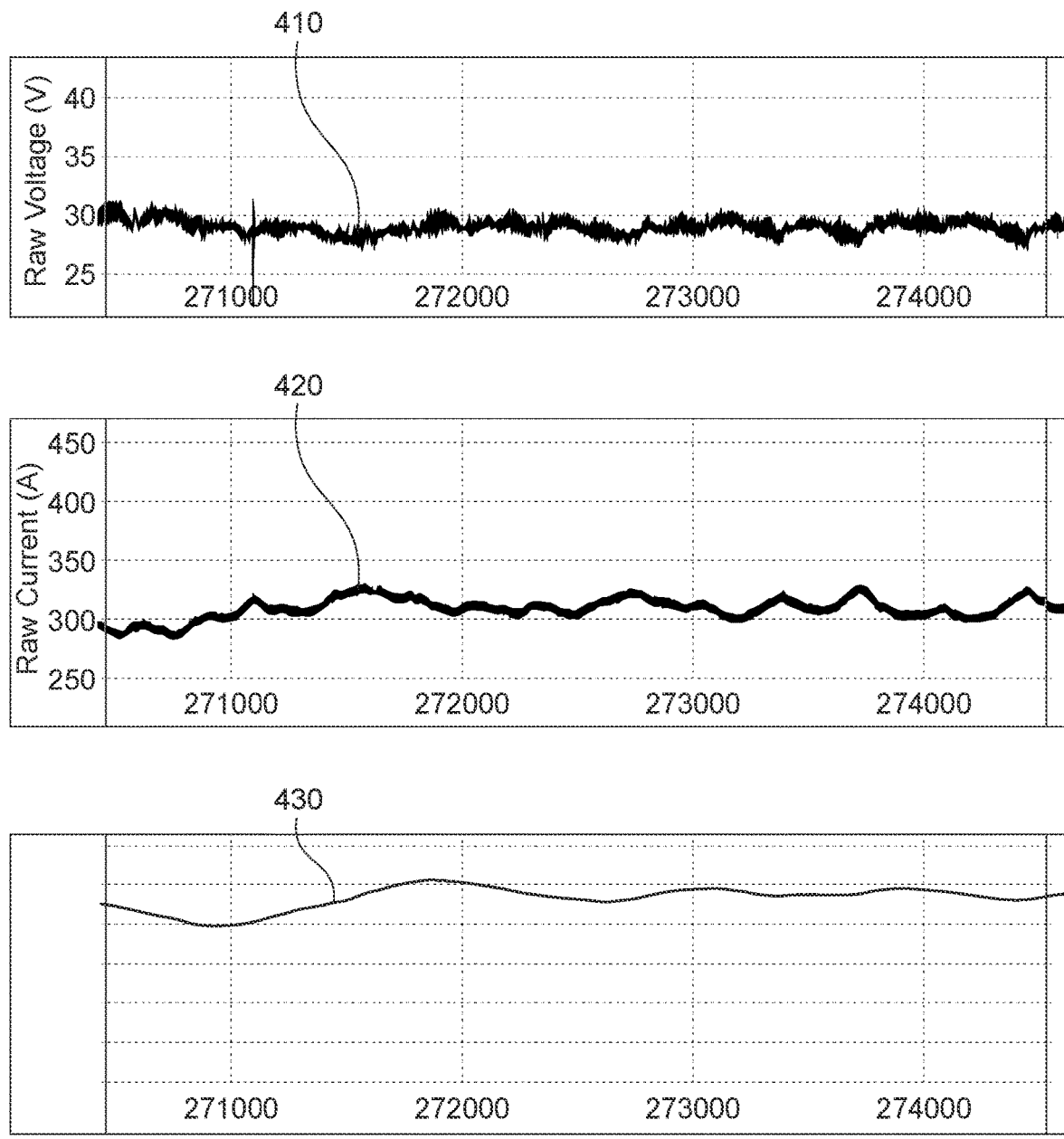
FIG. 4 illustrates one embodiment of traces of voltage and current for a conventional constant voltage (CV) arc welding process.

FIG. 4 illustrates one embodiment of traces of voltage and current for a conventional constant voltage (CV) arc welding process. The top trace 410 represents raw voltage (V) and the middle trace 420 represents raw current (I). The conventional CV arc welding process is regulated by a voltage-amp characteristic (e.g., as in FIG. 2). An adaptive response is shown in the bottom trace 430 as a feedback loop on voltage to maintain an average voltage or arc length.

Figure 5:
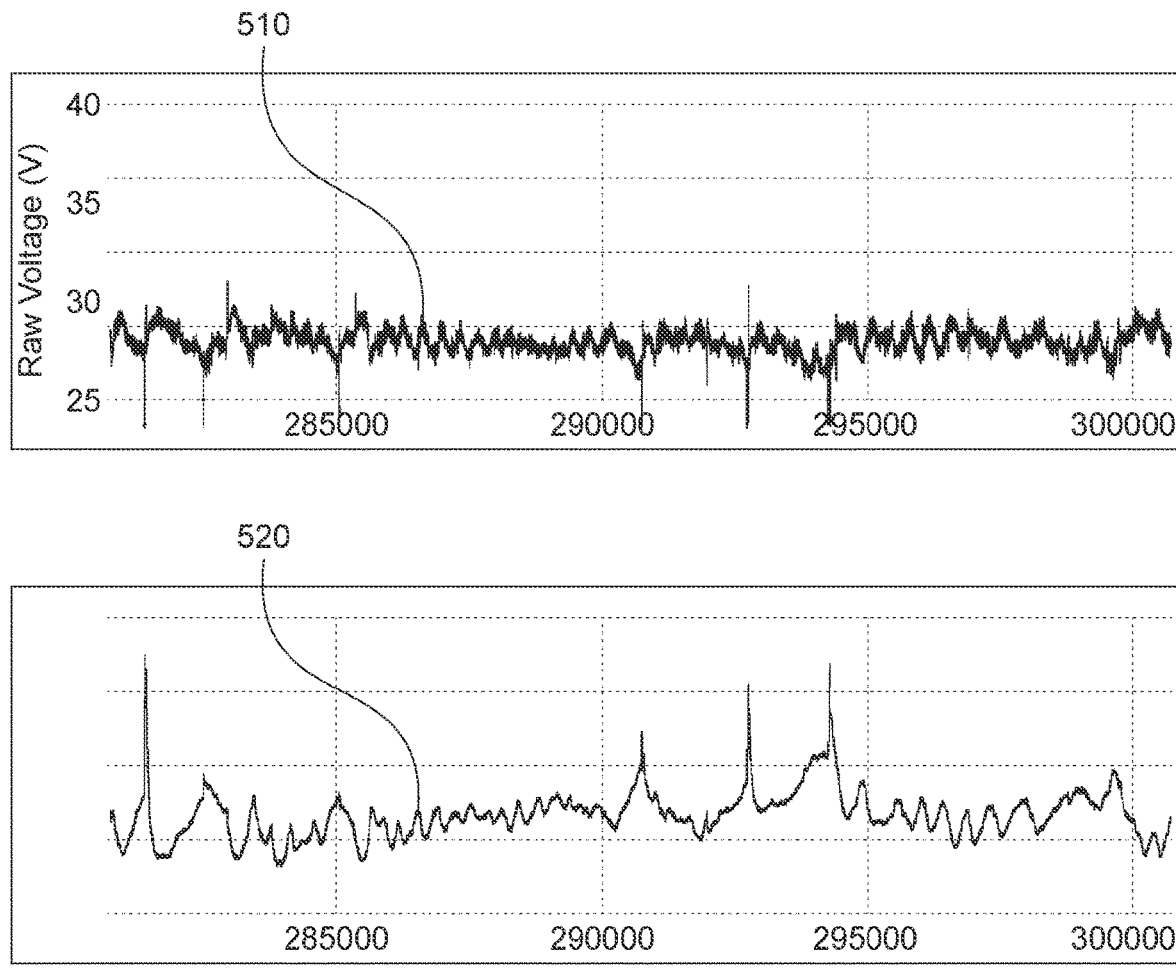
FIG. 5 illustrates one embodiment of traces of voltage and current for a conventional constant voltage (CV) arc welding process having several spikes of current and corresponding depressions in voltage.

FIG. 5 illustrates one embodiment of traces of voltage and current for a conventional constant voltage (CV) arc welding process having several spikes of current and corresponding depressions in voltage. The top trace 510 represents raw voltage (V) and the bottom trace 520 represents raw current (I). The spikes of current and corresponding depressions in voltage indicate where larger droplets transfer to the weld pool. The events appear every 1 to 5 hertz in conventional CV. When pulsed, the transfers occur more often and do not require the spike of current to clear, resulting in less spatter.

Figure 6:
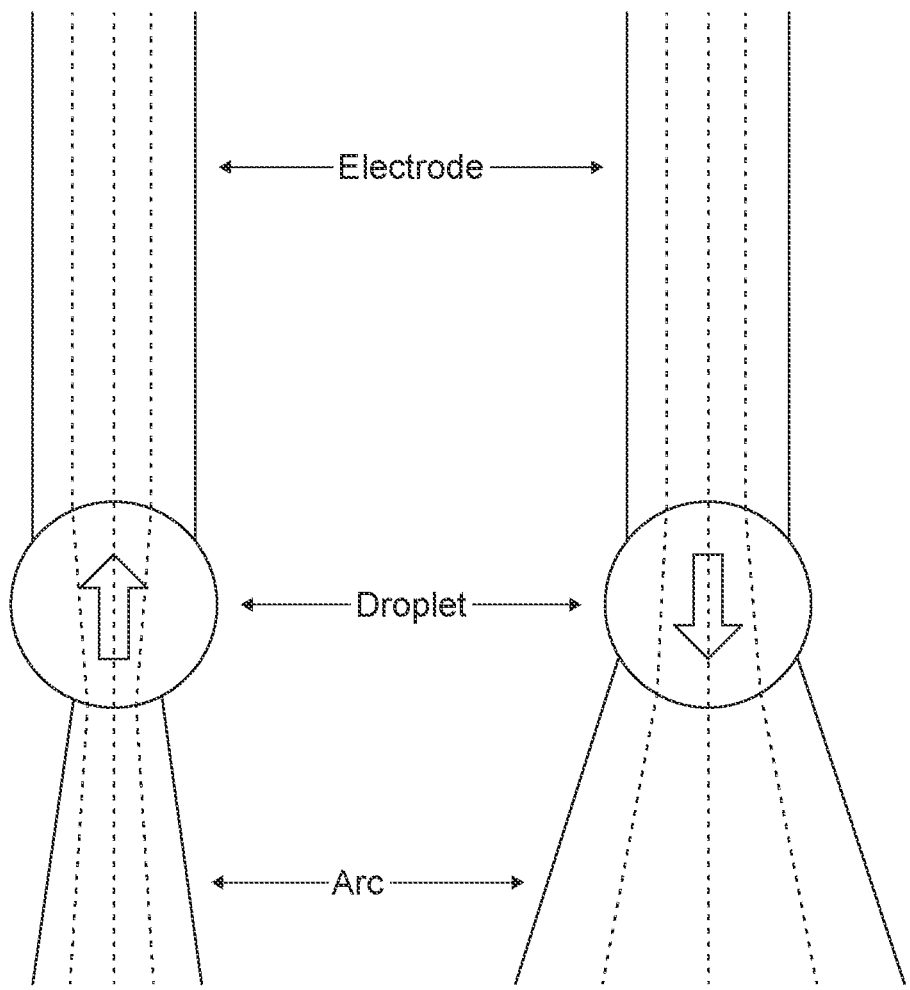
FIG. 6 illustrates the difference between using $CO_2$ as a shielding gas and using argon as a shielding gas.

FIG. 6 illustrates the difference between using $CO_2$ as a shielding gas and using argon as a shielding gas. A repulsive force is created when $CO_2$ is used as the shielding gas (on the left in FIG. 6) vs. when argon is used as the predominate shielding gas (on the right in FIG. 6). Argon results in a wide arc as current leaves the droplet and, therefore, the force is downward making the droplet push from the end of the wire(s). $CO_2$ constricts the current as it leaves the end of the droplet, creating an upward force on the droplet.

Figure 7:
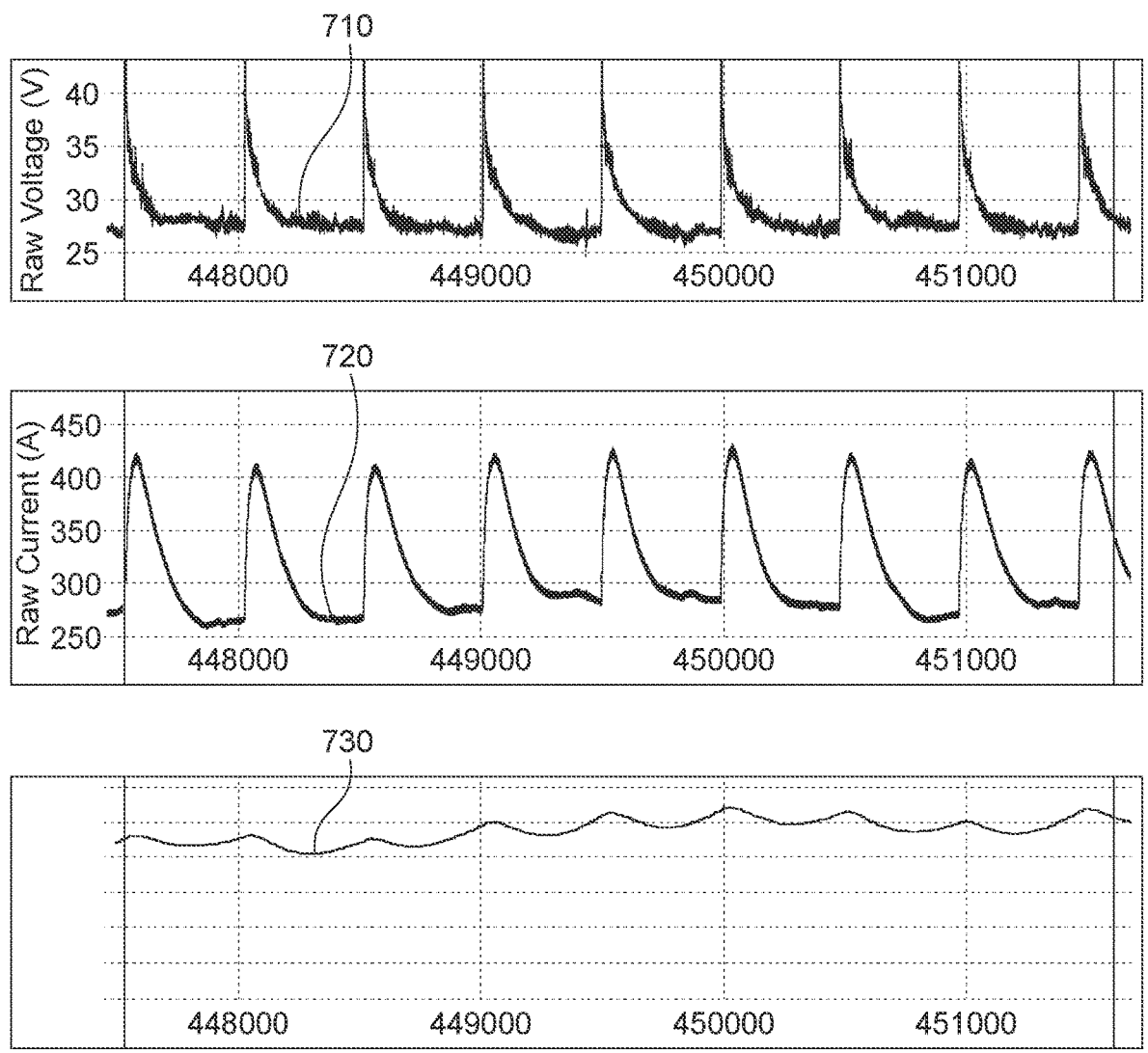
FIG. 7 illustrates traces of voltage and current for an improved arc welding process, in accordance with an embodiment of the present invention.

FIG. 7 illustrates traces of voltage and current for an improved arc welding process, in accordance with an embodiment of the present invention. The top trace 710 represents raw voltage (V) and the middle trace 720 represents raw current (I). The traces show a new pulsed waveform which includes the conventional voltage-amp characteristic along with pulses of current that are superimposed (i.e., a modified waveform of a modified CV flux cored arc welding process). Each pulse of current places a repulsive force upward on a droplet at the end of the welding wire electrode. When a pulse of current is relaxed (decays), the force is removed and the droplet springs back, often making contact with the weld pool. In this manner, by adding the pulses of current, the molten metal droplet tends to not get too large before making contact with and transferring into the weld pool. This is particularly useful when using $CO_2$ as the shielding gas. The traces 710 and 720 correspond to the following conditions: 300 inches per minute (ipm) wire feed speed at 29V/310 amps using twin (two wires) 0.045 Ultracore 12C welding wire shielded under 100% $CO_2$ gas.

In one embodiment, each superimposed current pulse represents an additional 175 amps of current for a duration of 1.5 milliseconds, and is applied at about 70 hertz. A single droplet of the molten metal droplets is transferred to the weld puddle for every two or more pulses of the superimposed welding current pulses. A user interface (e.g., user knobs, push buttons, or a touch screen display) may be defined to adjust the amplitude and/or the duration and/or the frequency of the superimposed current pulses. An adaptive response (shown in the bottom trace 730) maintains the average voltage (e.g., about 28 volts). The average current depends on the contact-tip-to-work-distance (CTWD) and may be, for example, 265 amps. In this embodiment, the process is running two 0.045 or 1.2 mm FCAW wires at 250 ipm wire feed speed. Both wires are running through the same contact tip, side-by-side, through the same orifice of the contact tip. The same current with the superimposed pulses is applied to both wires. Other embodiments may have both wires running through separate orifices of a contact tip, or may only use one wire (e.g., a 1/16 or 0.052 FCAW wire).

Figure 8:
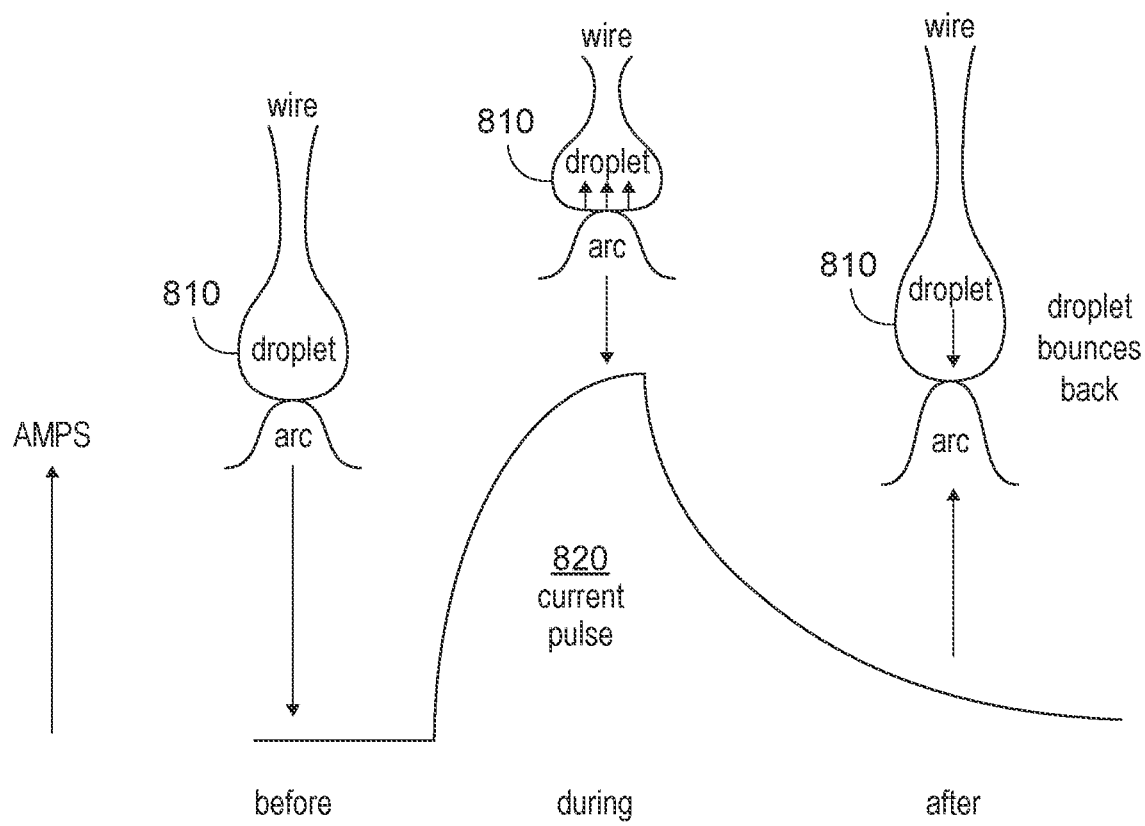
FIG. 8 illustrates one embodiment of the transfer of a molten metal droplet using the improved arc welding process of FIG. 7 when using $CO_2$ shielding gas.

FIG. 8 illustrates one embodiment of the transfer of a molten metal droplet using the improved arc welding process of FIG. 7 when using $CO_2$ shielding gas. The droplet 810 is shown at several stages in relation to before, during, and after a current pulse 820. The current pulse 820 repulses the droplet 810 upward (as indicated by the upward pointing arrows shown within the droplet 810). This is unlike conventional pulsed welding where the force pushes the droplet toward the weld pool. When the current relaxes (after the peak), the droplet 810 re-bounds and shoots toward the weld pool (as indicated by the downward pointing arrow shown within the droplet 810) with the tendency to touch the weld pool and transfer.

Figure 9:
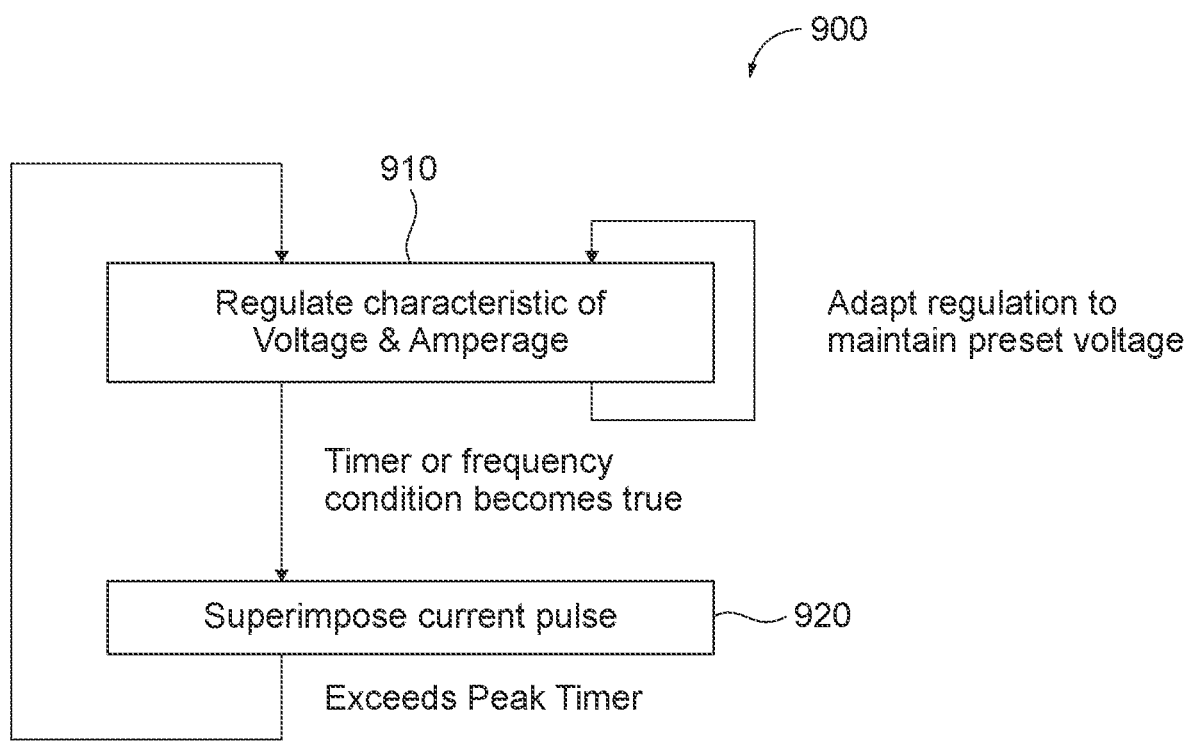
FIG. 9 illustrates a flowchart of one embodiment of the improved arc welding process as disclosed herein.

FIG. 9 illustrates a flowchart of one embodiment of the improved arc welding process 900 as disclosed herein. In step 910 of the process 900, a volt-amp (VI) characteristic is regulated by a welding power source and is adapted to maintain a preset voltage (e.g., an average welding output voltage resulting in an average arc length). Once a timer or frequency condition becomes true (e.g., in the controller 118) then, in step 920 of the process 900, a current pulse is superimposed onto the welding current. After a peak time (e.g., as determined by the controller 118), the arc welding process reverts back to step 910 and the process repeats. In this way, the welding current pulses are superimposed onto a welding waveform of a constant voltage (CV) flux cored arc welding process in a welding power source to generate a modified waveform of a modified CV flux cored arc welding process. Two flux cored welding wire electrodes are powered by the same welding output voltage and welding output current produced by the welding power source during the modified flux cored arc welding process using the modified waveform. $CO_2$ is used as a shielding gas as part of the modified flux cored arc welding process. The superimposed welding current pulses are superimposed in time to facilitate formation of molten metal droplets between ends of the two flux cored welding wire electrodes during the modified CV flux cored arc welding process. This results in the molten metal droplets being smaller in size, at times of transfer to a weld puddle, than otherwise would be without the superimposed welding current pulses. In this manner, better control of the size of the molten metal droplets that form on the end of the welding wire electrode(s) is achieved, resulting in a more desirable transfer of the droplets to the weld puddle with less spatter.

Figure 10:
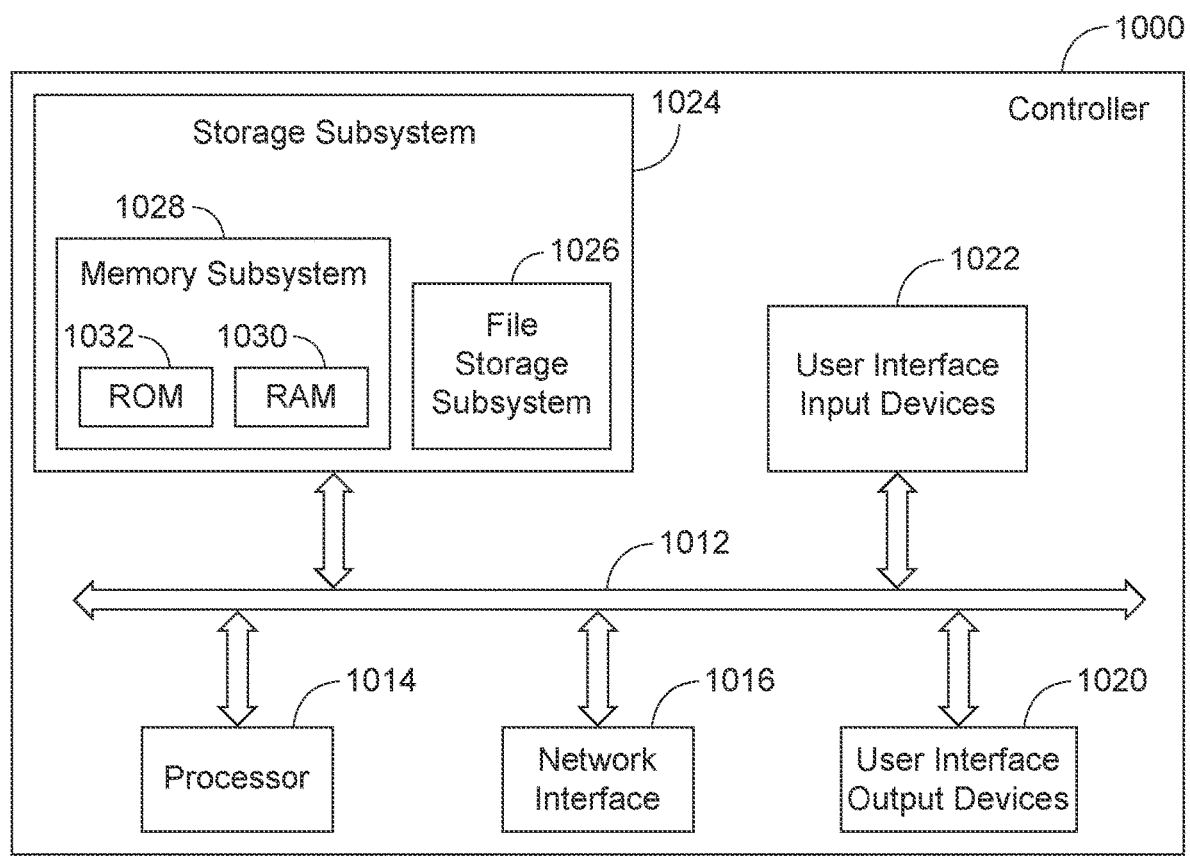
FIG. 10 illustrates a block diagram of an example embodiment of a controller that can be used, for example, in the system of FIG. 1.

FIG. 10 illustrates a block diagram of an example embodiment of a controller 1000 that can be used, for example, in the system of FIG. 1 (e.g., as the controller 118). Referring to FIG. 10, the controller 1000 includes at least one processor 1014 (e.g., a microprocessor, a central processing unit, a graphics processing unit) which communicates with a number of peripheral devices via bus subsystem 1012. These peripheral devices may include a storage subsystem 1024, including, for example, a memory subsystem 1028 and a file storage subsystem 1026, user interface input devices 1022, user interface output devices 1020, and a network interface subsystem 1016. The input and output devices allow user interaction with the controller 1000. Network interface subsystem 1016 provides an interface to outside networks and is coupled to corresponding interface devices in other devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 1000 or onto a communication network.

User interface output devices 1020 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 1000 to the user or to another machine or computer system.

Storage subsystem 1024 stores programming and data constructs that provide some or all of the functionality described herein. For example, computer-executable instructions and data are generally executed by processor 1014 alone or in combination with other processors. Memory 1028 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 1026 in the storage subsystem 1024, or in other machines accessible by the processor(s) 1014.

Bus subsystem 1012 provides a mechanism for letting the various components and subsystems of the controller 1000 communicate with each other as intended. Although bus subsystem 1012 is shown schematically as a single bus, alternative embodiments of the bus subsystem may use multiple buses.

The controller 1000 can be of varying types. Due to the ever-changing nature of computing devices and networks, the description of the controller 1000 depicted in FIG. 10 is intended only as a specific example for purposes of illustrating some embodiments. Many other configurations of a controller are possible, having more or fewer components than the controller 1000 depicted in FIG. 10.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. An arc welding system providing improved molten metal droplet transfer, the arc welding system comprising:
   a welding power source including:
      a welding power supply,
      a welding waveform generator, and
      a controller;
   two flux cored welding wire electrodes operatively connected to the welding power source, where the two flux cored welding wire electrodes are powered by a same welding output voltage and welding output current produced by the welding power source; and
   a feedback circuit operatively connected to the welding power source to provide an adaptive response to maintain an average welding output voltage,
   wherein the controller is programmed to control at least the welding waveform generator and the welding power supply to superimpose welding current pulses onto a welding waveform of a constant voltage (CV) flux cored arc welding process, that uses $CO_2$ as a shielding gas, to generate a modified waveform of a modified CV flux cored arc welding process, and
   where the superimposed welding current pulses are superimposed in time to facilitate formation of molten metal droplets between ends of the two fluxed cored welding wire electrodes during the modified CV flux cored arc welding process, resulting in the molten metal droplets being smaller in size, at times of transfer to a weld puddle, than otherwise would be without the superimposed welding current pulses.

2. The arc welding system of claim 1, where a single droplet of the molten metal droplets is transferred to the weld puddle for every two or more pulses of the superimposed welding current pulses.

3. The arc welding system of claim 1, wherein the feedback circuit includes a voltage feedback circuit.

4. The arc welding system of claim 1, wherein the feedback circuit includes a current feedback circuit.

5. The arc welding system of claim 1, wherein the $CO_2$ shielding gas constricts the welding output current as the welding output current leaves an end of a droplet of the molten metal droplets, creating an upward force on the droplet away from the weld puddle.

6. The arc welding system of claim 1, wherein each current pulse of the superimposed welding current pulses generates an upward force on a droplet of the molten metal droplets away from the weld puddle.

7. The arc welding system of claim 1, further comprising a user interface configured to adjust at least one of an amplitude, a duration, and a frequency of the superimposed welding current pulses.

8. The arc welding system of claim 1, further comprising a welding gun configured to facilitate passage of the two flux cored welding wire electrodes there-through.

9. The arc welding system of claim 8, further comprising at least one wire feeder configured to feed the two flux cored welding wire electrodes to the welding gun.

10. The arc welding system of claim 8, wherein the welding gun includes a contact tip through which the two flux cored welding wire electrodes are configured to pass side-by-side and out of a same orifice of the contact tip.

11. An arc welding method providing improved molten metal droplet transfer, the arc welding method comprising:
   superimposing welding current pulses onto a welding waveform of a constant voltage (CV) flux cored arc welding process in a welding power source to generate a modified waveform of a modified CV flux cored arc welding process;
   powering two flux cored welding wire electrodes by a same welding output voltage and welding output current produced by the welding power source during the modified flux cored arc welding process using the modified waveform; and providing $CO_2$ as a shielding gas as part of the modified flux cored arc welding process, where the superimposed welding current pulses are superimposed in time to facilitate formation of molten metal droplets between ends of the two flux cored welding wire electrodes during the modified CV flux cored arc welding process, resulting in the molten metal droplets being smaller in size, at times of transfer to a weld puddle, than otherwise would be without the superimposed welding current pulses.

12. The arc welding method of claim 11, where a single droplet of the molten metal droplets is transferred to the weld puddle for every two or more pulses of the superimposed welding current pulses.

13. The arc welding method of claim 11, wherein the $CO_2$ shielding gas constricts the welding output current as the welding output current leaves an end of a droplet of the molten metal droplets, creating an upward force on the droplet away from the weld puddle.

14. The arc welding method of claim 11, wherein each current pulse of the superimposed welding current pulses generates an upward force on a droplet of the molten metal droplets away from the weld puddle.

15. The arc welding method of claim 11, further comprising adjusting at least one of an amplitude, a duration, and a frequency of the superimposed welding current pulses via a user interface of the welding power source.

16. The arc welding method of claim 11, further comprising passing the two flux cored welding wire electrodes side-by-side through and out of a same orifice of a contact tip of a welding gun.

17. The arc welding method of claim 16, further comprising feeding the two flux cored welding wire electrodes to the welding gun via a wire feeder.

18. The arc welding method of claim 11, further comprising:

regulating a voltage-current (VI) characteristic of the welding power source during the modified flux cored arc welding process; and adapting the voltage-current (VI) characteristic to maintain an average welding output voltage and an average arc length during the modified flux cored arc welding process as the two flux cored welding wire electrodes are powered by the welding power source.

19. The arc welding method of claim 18, further comprising feeding back the welding output voltage to a controller of the welding power source to facilitate the adapting.

20. The arc welding method of claim 18, further comprising feeding back the welding output current to a controller of the welding power source to facilitate the adapting.

* * * * *